(12) United States Patent
Schneider (10) Patent No.: US 8,380,662 B2
(45) Date of Patent: Feb. 19, 2013

(54) SETTING TIME FROM A NFS SERVER

(75) Inventor: James Paul Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 562 days.

(21) Appl. No.: 12/072,685

(22) Filed: Feb. 26, 2008

(65) Prior Publication Data

US 2009/0216909 A1   Aug. 27, 2009

(51) Int. Cl.
*G06F 17/30* (2006.01)
(52) U.S. Cl. ........................................ 707/610
(58) Field of Classification Search .................. 707/610, 707/827
See application file for complete search history.

(56) References Cited

U.S. PATENT DOCUMENTS

| | | | |
|---|---|---|---|
| 2002/0116405 A1* | 8/2002 | Bodnar et al. | 707/202 |
| 2003/0051026 A1* | 3/2003 | Carter et al. | 709/224 |
| 2003/0088650 A1* | 5/2003 | Fassold et al. | 709/220 |
| 2003/0172145 A1* | 9/2003 | Nguyen | 709/223 |
| 2004/0236443 A1* | 11/2004 | Ware et al. | 700/90 |
| 2005/0044080 A1* | 2/2005 | Fridella et al. | 707/10 |
| 2005/0124306 A1* | 6/2005 | Cheng | 455/158.4 |
| 2006/0047923 A1* | 3/2006 | Kodama | 711/161 |
| 2006/0075053 A1* | 4/2006 | Xu et al. | 709/206 |
| 2007/0168336 A1* | 7/2007 | Ransil et al. | 707/3 |
| 2007/0239760 A1* | 10/2007 | Simon | 707/102 |
| 2007/0277227 A1* | 11/2007 | Brendel | 726/3 |

\* cited by examiner

*Primary Examiner* — Son T Hoang
(74) *Attorney, Agent, or Firm* — Lowenstein Sandler LLP (57) ABSTRACT

A system time of a client is set from a network file system (NFS) server. In one embodiment, the client creates a file on the (NFS) server and reads the last-modified time attribute of the file. The client adjusts its system time accordingly based on the last-modified time attribute of the file. The file is then deleted from the NFS server.

21 Claims, 7 Drawing Sheets

SETTING TIME FROM A NFS SERVER

TECHNICAL FIELD

Embodiments of the present invention relate to computing systems, and more particularly, to setting a time on a local client connected to an NFS server.

BACKGROUND

A time server is a server computer that reads the actual time from a reference clock and distributes this information to its clients using a computer network, such as the Internet. The time server may be a local network time server or an internet time server. The most important and widely-used protocol for distributing and synchronising time is the Network Time Protocol (NTP). NTP is a protocol for synchronizing the clocks of computer systems over packet-switched, variable-latency data networks.

Figure 1:
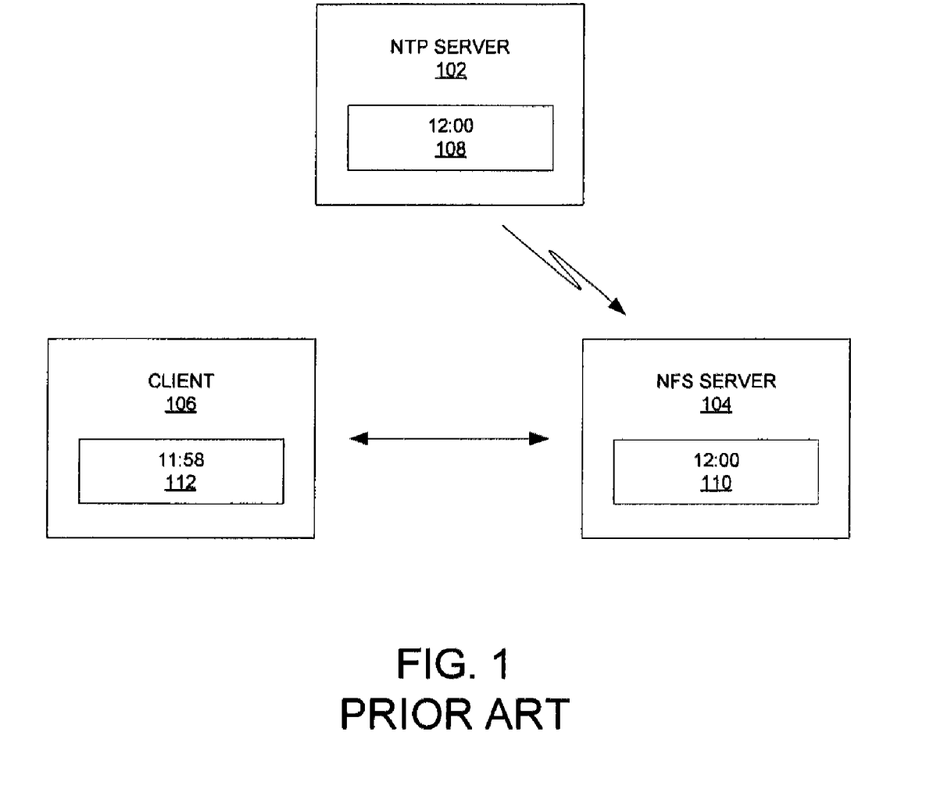
FIG. 1 is a block diagram illustrating a client connected to an NFS server in accordance with a prior art.

Despite being synchronized to an NTP server, the system time of an NFS server may be different from the system time of a client connected to the NFS server. FIG. 1 illustrates such scenario. A client 106 has its own system time 112. A NFS server 104 is synced to a NTP server 102. Accordingly, the system time 110 of NFS server 104 is synced to the system time 108 of NTP server 102. System time 112 of client 106 may be behind system time 110 of client 104.

This time delay can cause time-dependent build steps on the client to fail since NFS server's notion of now was a few minutes in the future from the point of view of client 106. Thus, a need exists for a technique to use the NFS server as a reliable timing source.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for setting time from a Network File System server. In one embodiment, a client creates a file on the (NFS) server and reads the last-modified time attribute of the file. The client adjusts its system time accordingly based on the last-modified time attribute of the file. The file is then deleted from the NFS server.

Figure 2:
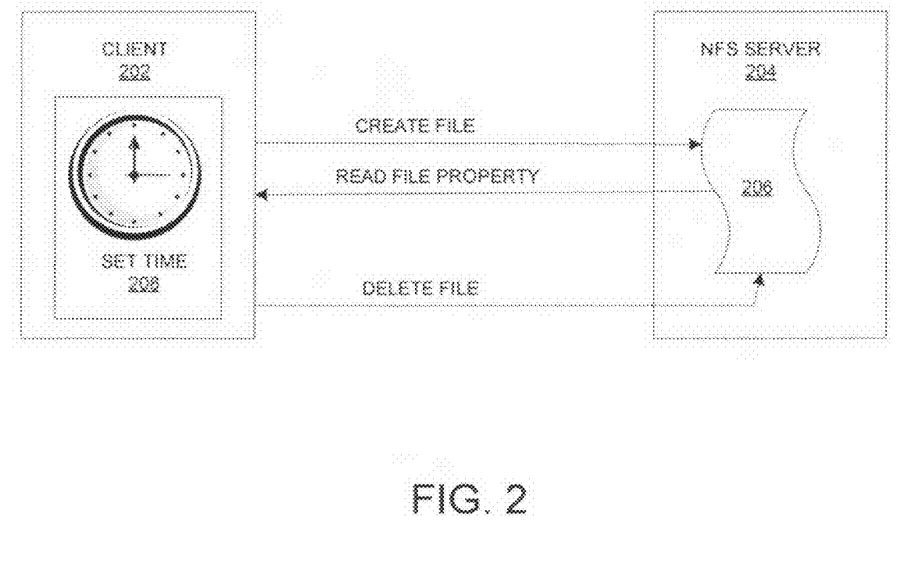
FIG. 2 is a block diagram illustrating one embodiment of a client setting its local time from a NFS server.

FIG. 2 is a block diagram illustrating one embodiment of a client 202 setting its local time 208 from a NFS server 204. Client 202 is coupled to NFS server 204 via a network. Client 202 creates a zero-length file 206 on an NFS-mounted directory from NFS server 204. Client 202 reads the last-modified time attribute of zero-length file 206 and sets its system time based on the last-modified time attribute of zero-length file 206. Client 202 then deletes zero-length file 206 after its system time has been set.

Figure 3:
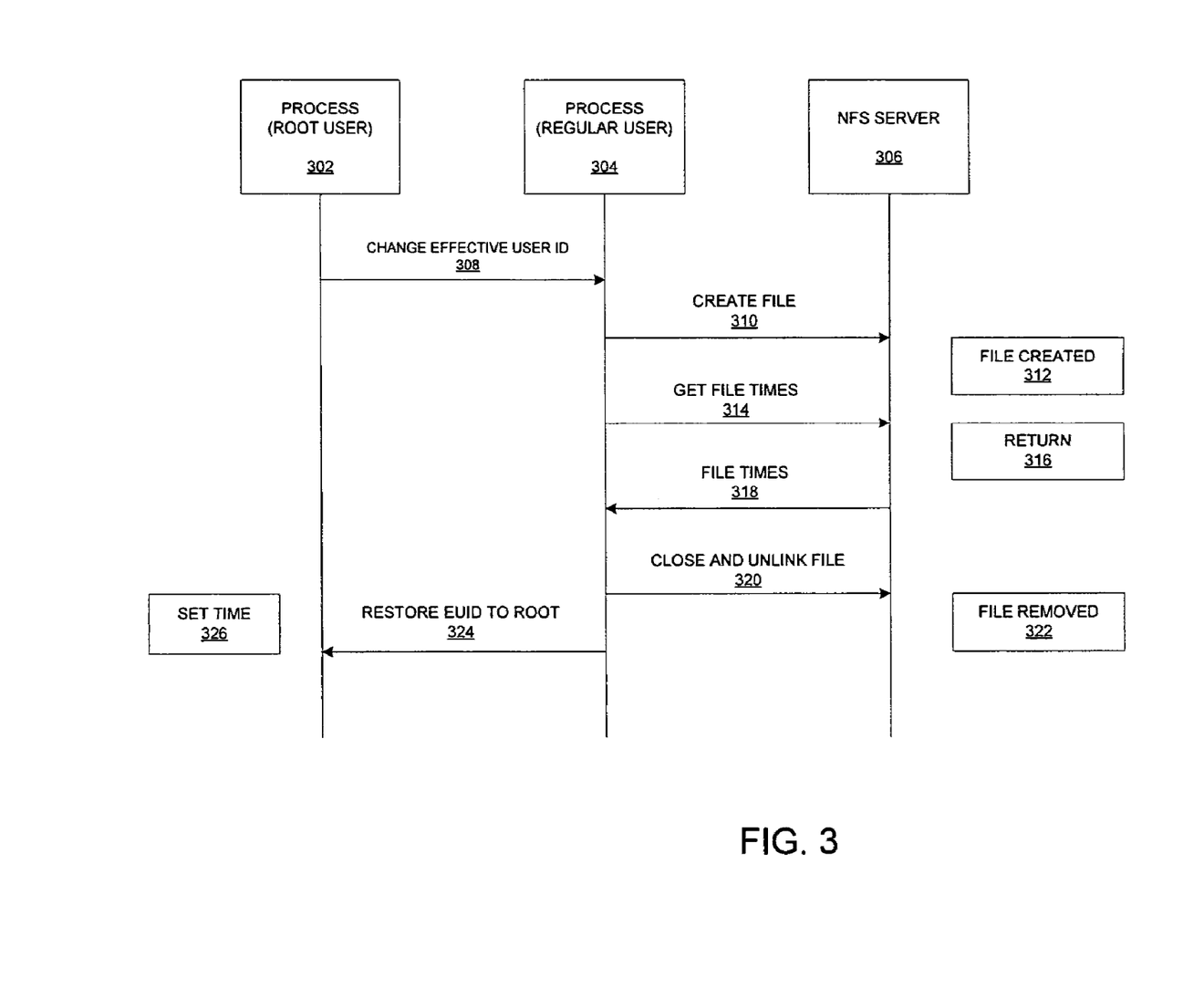
FIG. 3 is a ladder diagram illustrating one embodiment of a method for setting time from a NFS server.

FIG. 3 is a ladder diagram illustrating one embodiment of a method for setting time from a NFS server where a process of the client temporarily changes its effective user ID. A root user process 302 of the client requests for a change of the effective user ID for the client in 308. Regular user process 304 creates a file in 310 on NFS server 306. The file is created in 312. Process 304 then asks for a property of the newly created file, such as its last-modified time in 314. NFS server 308 processes the request in 316, and returns the last-modified time of the file in 318. Process 304 upon receiving the last-modified time of the file closes and unlinks the file in 320. NFS server 306 accordingly removes the file in 322. In 324, process 304 restores the effective user ID back to root use process 302 which resets the system time of the client based on the last-modified time of the file in 326.

Figure 4:
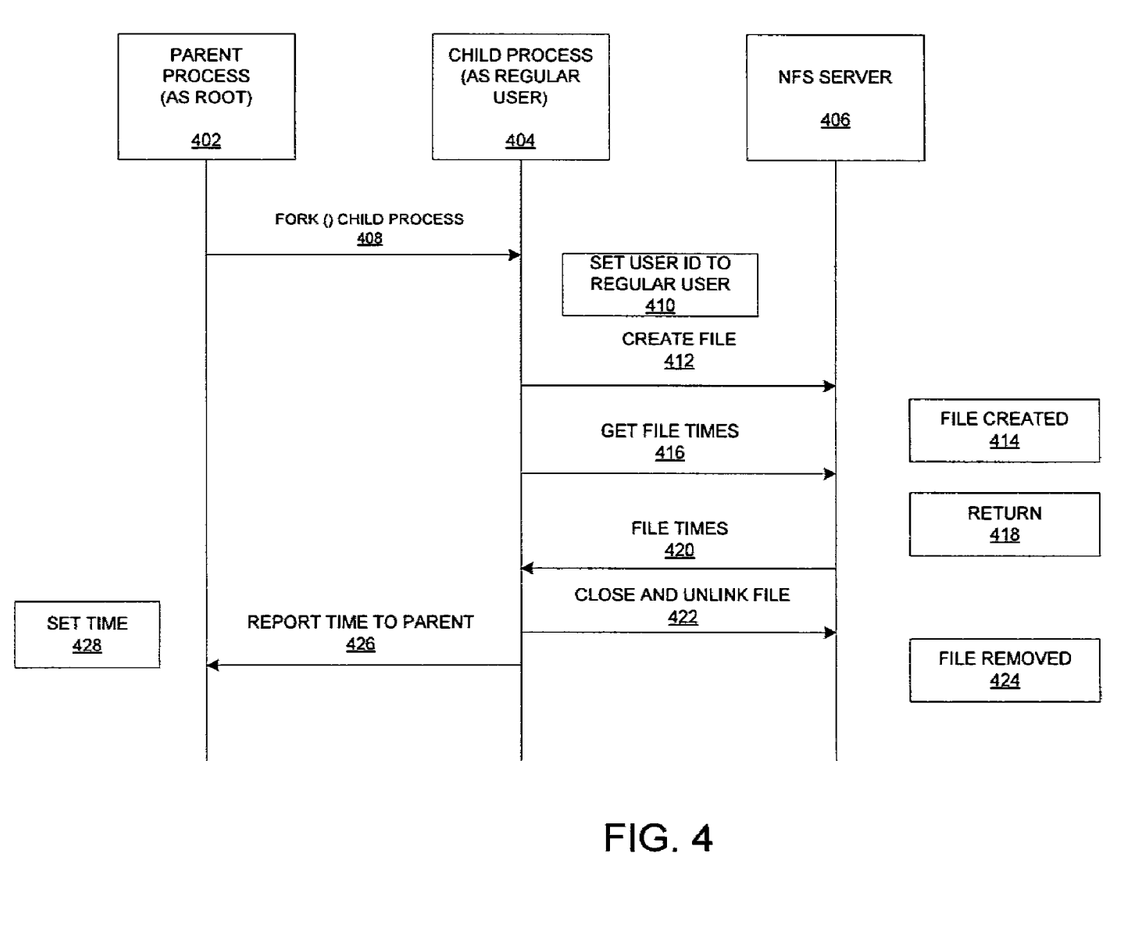
FIG. 4 is a ladder diagram illustrating another embodiment of a method for setting time from a NFS server.

FIG. 4 is a ladder diagram illustrating another embodiment of a method for setting time from a NFS server using a child process. A parent process 402 of the client requests for child process in 408. Child process 408 sets the user ID to a regular user in 410. Child process 408 then requests to create a file on NFS server 406 in 412. In response, NFS server 406 creates the file in 414. Child process 404 then asks for a property of the newly created file, such as its last-modified time in 416. NFS server 406 processes the request in 418, and returns the last-modified time of the file in 420. Child process 404 upon receiving the last-modified time of the file closes and unlinks the file in 422. NFS server 406 accordingly removes the file in 424. In 426, child process 404 reports the last-modified time of the file back to parent process 402 which resets the system time of the client based on the last-modified time of the file in 428. In one embodiment, the implementation detail of "report time to parent" includes forming a pipe( ) function call before the fork( ), and reading the result from the first file descriptor in the returned set. Child process 404 would write its result to the second file descriptor from pipe( ), close it, and then exit.

Figure 5:
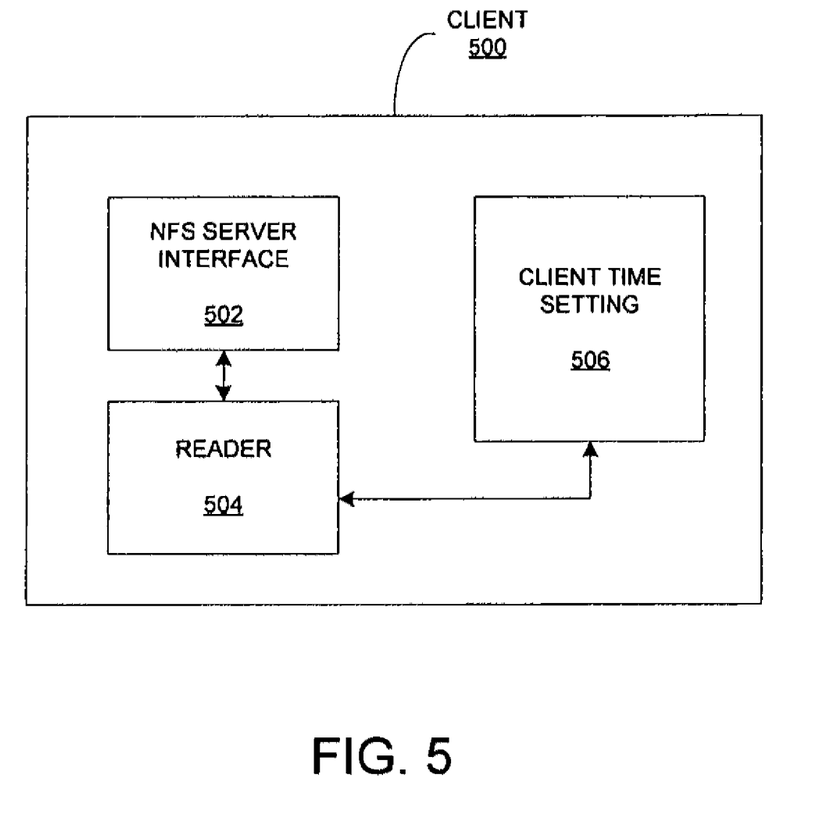
FIG. 5 is a block diagram illustrating one embodiment of a client.

FIG. 5 is a block diagram illustrating one embodiment of a client 500. Client 500 includes a NFS Server Interface 502, a reader 504, and a client time setting 506. NFS Server Interface is configured to create and delete files on a NFS server coupled to client 500. Reader 504 is configured to read a property of the newly created file. Client time setting 506 includes a system time client changer configured to set a system time of client 500 based on the property of the file. The property of the file includes for example, a last-modified time attribute.

In one embodiment, NFS Server Interface 502 is configured to create a subdirectory of the client with write permissions on the NFS server, and to route the requests to create, read, and delete the file through the subdirectory.

In another embodiment, NFS Server Interface 502 is configured to change an effective user ID of the client from a root user to a regular user. The regular user has rights to create a file at a specific location on the NFS server (in particular, in directories owned by that user). The root user does not have such rights. In one embodiment, the regular user does not have rights to modify a system-wide variable on the NFS server.

The NFS Server Interface is configured to perform the requests to create, read, and delete the file with the regular user, and to restore the effective user ID of the client back to the root user after the file has been deleted in the NFS server.

In another embodiment, NFS server interface 502 is configured to form a child process from a parent process of the client. The child process has rights to create a file at a specific location on the NFS server. NFS server interface 502 is configured to perform the requests to create, read, and delete the file with the child process, and to restore the parent process after the file has been deleted in the NFS server.

Figure 6:
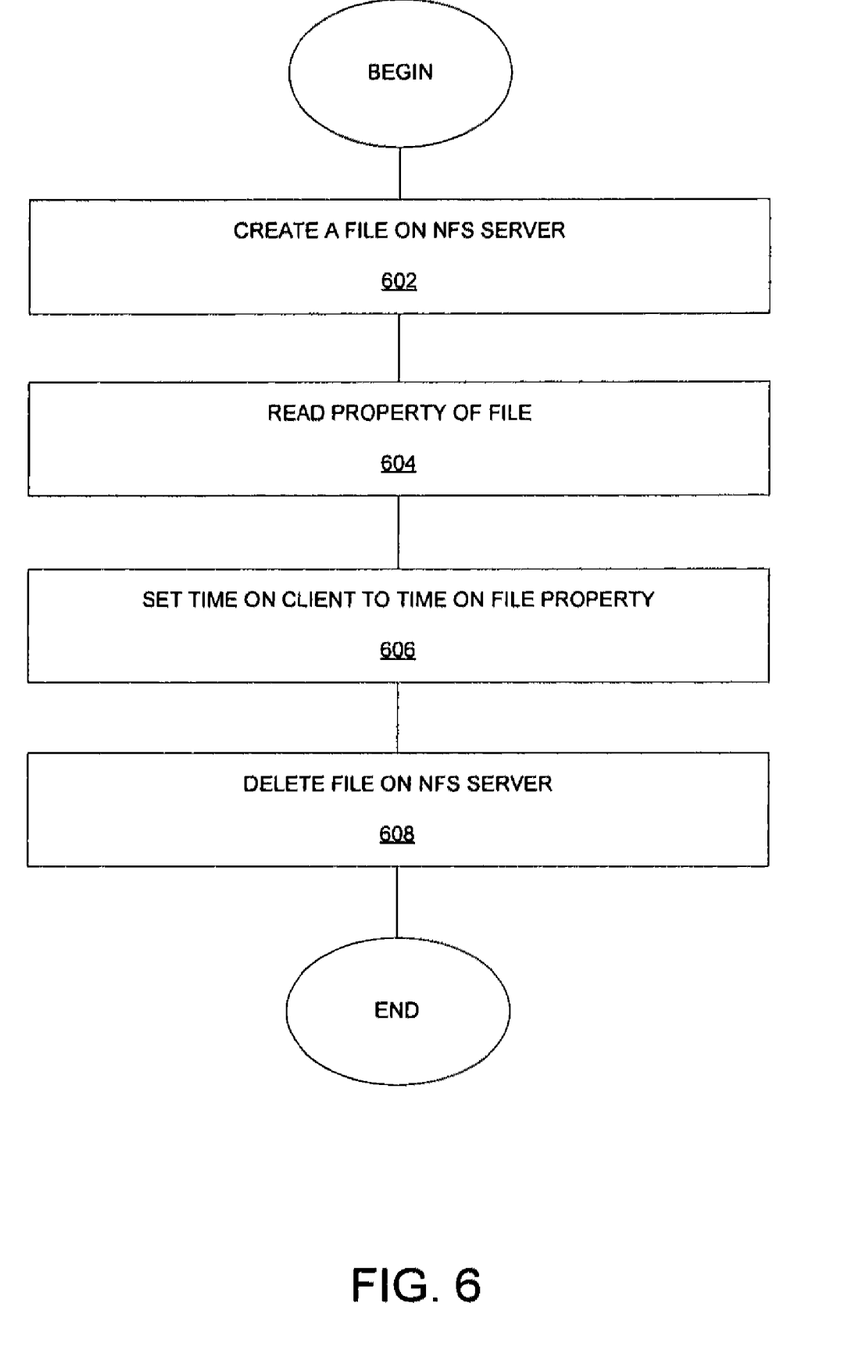
FIG. 6 is a flow diagram illustrating one embodiment of a method for setting time from a NFS server.

FIG. 6 is a flow diagram illustrating one embodiment of a method for setting time from a NFS server. At 602, a file is created on a NFS-mounted directory. A property of the file, such as the last-modified time, is read at 604. The system time of the client is set to the time based on the property of the file, such as the last-modified time at 606. The file is then deleted at 608.

Figure 7:
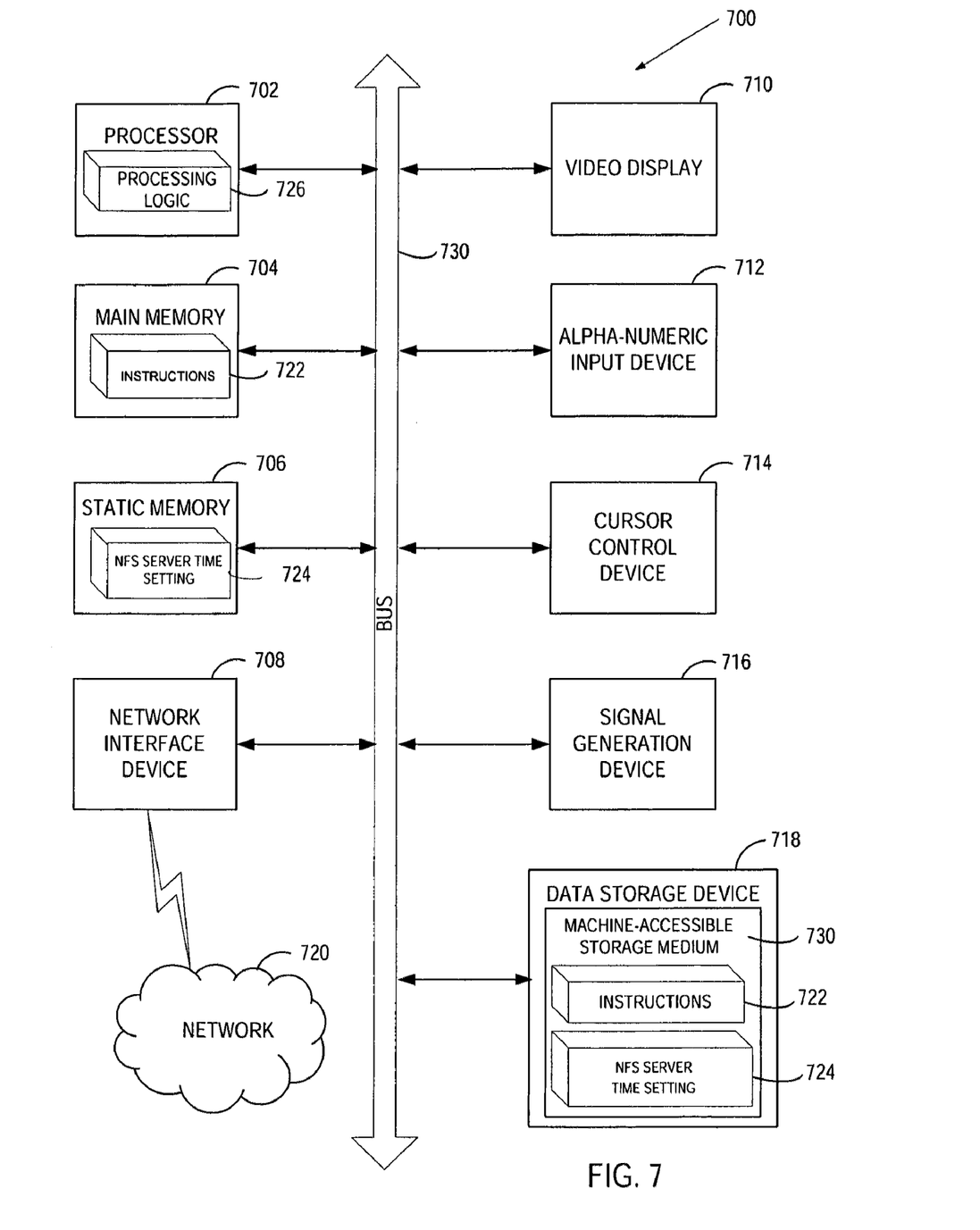
FIG. 7 is a block diagram illustrating an example of a computer system.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device 702, a main memory 704 (e.g., read-only memory (ROM), flash memory, dynamic random access memory (DRAM) such as synchronous DRAM (SDRAM), a static memory 706 (e.g., flash memory, static random access memory (SRAM), etc.), and a data storage device 718, which communicate with each other via a bus 730.

Processing device 702 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute the processing logic 726 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-accessible storage medium 730 on which is stored one or more sets of instructions (e.g., software 722) embodying any one or more of the methodologies or functions described herein. The software 722 may also reside, completely or at least partially, within the main memory 704 and/or within the processing device 702 during execution thereof by the computer system 700, the main memory 704 and the processing device 702 also constituting machine-accessible storage media. The software 722 may further be transmitted or received over a network 720 via the network interface device 708.

The machine-accessible storage medium 730 may also be used to store a NFS server time setting 724 as presently described. The NFS server time setting 724 may also be stored in other sections of computer system 700, such as static memory 706.

While the machine-accessible storage medium 730 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving, via a processor of a client device, an indication of a parent process requesting access to a network file system (NFS) server, wherein the NFS server allows client devices to remotely mount file systems over a network and interact with remotely mounted file systems as though the remotely mounted file systems are mounted locally;
   creating from the parent process, at the client device, a child process having limited rights to access the NFS server;
   creating, via the child process, a file on the NFS server;
   reading, via the child process, a property of the file;
   synchronizing a local system time of the client device with a remote system time of the NFS server based on the property of the file; and
   in response to synchronization of the local system time and the remote system time:
      deleting, via the child process, the file on the NFS server; and
      terminating the child process at the client device.

2. The method of claim 1, wherein the property of the file comprises a last-modified time attribute.

3. The method of claim 2, further comprising:
   creating a subdirectory on the client device with write permissions on the NFS server; and routing requests to create, read, or delete the file through the subdirectory.

4. The method of claim 1, further comprising:
   changing an effective user identification of the client device from a root user to a regular user, the regular user having limited rights on the NFS server prior to creating the file;
   performing requests to create, read, or delete the file with the regular user; and
   restoring the effective user ID of the client device back to the root user after the file has been deleted on the NFS server.

5. The method of claim 1, further comprising:
   restoring the parent process after the file has been deleted on the NFS server.

6. A non-transitory computer-readable storage medium containing data and instructions executable by a computer processor, causing the computer processor to perform operations comprising:
   receiving, at a client device, an indication of a parent process requesting access to a network file system (NFS) server, wherein the NFS server allows client devices to remotely mount file systems over a network and interact with remotely mounted file systems as though the remotely mounted file systems are mounted locally;
   creating from the parent process, at the client device, a child process having limited rights to access the NFS server;
   creating, via the child process, a file on the NFS server;
   reading, via the child process, a property of the file;
   synchronizing a local system time of the client device with a remote system time of the NFS server based on a property of the file; and
   in response to synchronization of the local system time and the remote system time:
      deleting, via the child process, the file on the NFS server; and
      terminating the child process at the client device.

7. The non-transitory computer-readable storage medium of claim 6, wherein the property of the file comprises a last-modified time attribute.

8. The non-transitory computer-readable storage medium of claim 7, wherein the operations further comprise:
   creating a subdirectory on the client device with write permissions on the NFS server; and
   routing requests to create, read, or delete the file through the subdirectory.

9. The non-transitory computer-readable storage medium of claim 6, wherein the operations further comprise:
   changing an effective user identification of the client device from a root user to a regular user prior to creating the file, the regular user having rights to modify a system-wide variable on the NFS server;
   performing requests to create, read, or delete the file with the regular user; and
   restoring the effective user ID of the client device back to the root user after the file has been deleted on the NFS server.

10. The non-transitory computer-readable storage medium of claim 6, wherein the operations further comprise:
    restoring the parent process after the file has been deleted on the NFS server.

11. A client computer system comprising:
    a processing device comprising a network file system (NFS) server interface, a reader, and a system time client changer; and
    a clock coupled to the processing device, wherein the NFS server interface is configured to receive an indication of a parent process request access to an NFS server wherein the NFS server allows client devices to remotely mount file systems over a network and interact with remotely mounted file systems as though the remotely mounted file systems are mounted locally, to create and delete a file on an NFS server via a child process created from the parent process, and having limited rights to access the NFS server, wherein the reader is coupled to the NFS server interface and is configured to read the property of the file via the child process, and wherein the system time client changer is coupled to the reader and is configured to synchronize the clock with a remote system time of the NFS server based on the property of the file, and wherein the processing device deletes, via the child process, the file on the NFS server and terminates the child process upon synchronization of the clock with the remote system time.

12. The client computer system of claim 11, wherein the property of the file comprises a last-modified time attribute.

13. The client computer system of claim 12, wherein the NFS server interface is further configured to create a subdirectory on the client computer system with write permissions on the NFS server, and to route requests to create, read, or delete the file through the subdirectory.

14. The client computer system of claim 11, wherein the NFS server interface is further configured to change an effective user identification of the client from a root user to a regular user prior to creating the file, the regular user having limited rights on the NFS server, to perform requests to create, read, or delete the file with the regular user, and to restore the effective user ID of the client back to the root user after the file has been deleted on the NFS server.

15. The client computer system of claim 11, wherein the NFS server interface is further configured to restore the parent process after the file has been deleted on the NFS server.

16. A system comprising:
a network file system (NFS) server computer configured to allow client devices to remotely mount file systems over a network and interact with remotely mounted file systems as though the remotely mounted file systems are mounted locally; and
a client computer coupled to the NFS server computer, the client computer configured to:
receive an indication of a parent process requesting access to the NFS server computer,
create a child process from the parent process, wherein the child process has limited rights to access the NFS server computer,
create a file, via the child process, on the NFS server computer,
read a property of the file via the child process,
synchronize a local system time with a system time of the NFS server computer, in response to synchronization of the local system time and the system time, the client computer further configured to:
delete the file on the NFS server computer, and
terminate the child process at the client device.

17. The system of claim 16, further comprising:
a Network Time Protocol (NTP) server computer coupled to the NFS server computer, the NTP server computer configured to provide the system time to the NFS server computer, wherein the NTP server computer is used to synchronize time information of computer clients and one of other servers or reference time sources.

18. The system of claim 16, wherein the property of the file comprises a last-modified time attribute.

19. The system of claim 18, wherein the client computer is further configured to create a subdirectory with write permissions on the NFS server computer, and to route requests to create, read, or delete the file through the subdirectory.

20. The system of claim 16, wherein the client computer is further configured to change an effective user identification of the client computer from a root user to a regular user prior to creating the file, the regular user having limited rights on the NFS server computer, to perform requests to create, read, or delete the file with the regular user, and to restore the effective user ID of the client computer back to the root user after the file has been deleted on the NFS server computer.

21. The system of claim 16, wherein the client is further configured to restore the parent process after the file has been deleted on the NFS server computer.

* * * * *